United States Patent [19]

Tanaka

[11] Patent Number: 5,207,332
[45] Date of Patent: May 4, 1993

[54] APPARATUS FOR CLASSIFYING PHOTOGRAPHIC FILMS

[75] Inventor: Katsuhiko Tanaka, Kanagawa, Japan

[73] Assignee: Fuji Photo Film Co., Ltd., Kanagawa, Japan

[21] Appl. No.: 764,740

[22] Filed: Sep. 24, 1991

[30] Foreign Application Priority Data

Oct. 4, 1990 [JP] Japan ................. 2-267047

[51] Int. Cl.⁵ .................... B07C 5/344; B07C 5/36
[52] U.S. Cl. ................ 209/569; 198/360; 198/361; 209/698; 209/916
[58] Field of Search ........... 209/3.1, 3.3, 569, 552, 209/698, 916, 548; 198/360, 361, 369; 354/105, 109

[56] References Cited

U.S. PATENT DOCUMENTS 3,246,752  4/1966  Wilson ................. 209/698 X
4,574,692  3/1986  Wahli .................. 354/105 X
4,838,435  6/1989  Alexandre et al. ........ 209/555

FOREIGN PATENT DOCUMENTS 275226  1/1990  Fed. Rep. of Germany ...... 198/360

Primary Examiner—Donald T. Hajec
Attorney, Agent, or Firm—Sughrue, Mion, Zinn, Macpeak & Seas

[57] ABSTRACT

An apparatus for classifying photographic films in which cartridges are classified according to a customer's order information, each cartridge storing a photographic film having a recording portion on which a customer's order information is magnetically recorded. The apparatus includes a plurality of classifying portions, a selector unit for selecting one of the plurality of classifying portions based on the customer order information read from the recording portion of the film, and a transfer unit for moving the cartridge into the selected classifying portion. In consequence, the cartridge can be automatically classified.

20 Claims, 7 Drawing Sheets

APPARATUS FOR CLASSIFYING PHOTOGRAPHIC FILMS

BACKGROUND OF THE INVENTION

1. Field of the Invention

The present invention relates to an apparatus for classifying photographic films, in which cartridges for storing photographic films are classified according to each customer's order information, which is magnetically recorded on a recording portion of the film.

2. Description of the Related Art

Conventionally, photographed films, for example, negative films have been stored into a DP (developing and printing) bag so that they may be passed for developing and the like. On the DP bag, order information such as a distinction of the developing and simultaneous printing of the negative film, print size, kind of surface or the like is written, and in the laboratory shop, the content of the order information written on this DP bag may be visually discriminated to classify the negative films for each simultaneous operation. Thus the complexity of the work after the developing operation is eliminated to improve the working efficiency.

However, since the negative films are classified by the manual work of the operator, the working efficiency of the classifying work is bad. In addition, since the content of the order information is visually discriminated by the operator, he can misjudge and perform an operation which does not corresponds to the order information, which in turn causes a trouble of repeated operation.

In view of the foregoing facts, an object of the present invention is to achieve an apparatus for classifying photographic films which allows erroneous judgment to be eliminated to improve the working efficiency.

SUMMARY OF THE INVENTION

The apparatus for classifying the photographic films according to the present invention is one for classifying cartridges for storing the photographic films, which have a recording portion in which the customer's order information is magnetically recorded, are classified according to each of the order information comprising:

a plurality of classifying portions;

a film driving means for delivering the photographic film out of the cartridge;

a reader means for reading the order information from the recording portion of the delivered photographic film, the driving means being operative winding and for storing the delivered photographic film into the cartridge after the order information is read by the reader means;

a selector means for selecting one of the plurality of classifying portions based on the order information read by the reader means; and a transfer means for transferring the cartridge to the selected classifying portion.

According to the above described information, a recording portion is provided in which the order information is magnetically recorded on the photographic film. For this recording portion, for example, a blushed portion at the tip end of the photographic film is the most suitable. The order information is recorded on the recording portion.

The photographic film is delivered out of the cartridge by means of the delivery driving means and the order information recorded on the recording portion is read by means of the reader means. Thereafter, the photographic film is stored into the cartridge by the driving means and, based on the order information read by a read head, one of the plurality of classifying portions is selected by means of the selector means to transfer the cartridge to the selected classifying portion by means of the transfer means.

According to a specific embodiment of the present invention, the plurality of classifying portions is continuously provided in the transferring direction of the cartridge by the transfer means. In addition, the classifying portions are each provided with a cartridge storing portion for storing the cartridge. Further, the classifying portions are each provided with a retainer portion fixed over all the clarifying portions, and a retainer member, which is provided at each classifying portion corresponding to the retainer portion, and which retains the cartridge with the retainer portion while being movable between a first position where the cartridge is allowed to move to the next classifying portion by means of a transfer means and a second position where the cartridge is dropped into the cartridge storing portion.

In addition, at each of the classifying portions, a slide means such as a roller is provided so that when the cartridge is transferred by means of the transfer means the cartridge may be smoothly transferred.

For example, it is conceivable that the cartridges can be classified in the following manners of (a) and (b).

(a) The simultaneous printing is performed (developing plus printing).

(b) The simultaneous printing is not performed (developing alone).

Incidentally, in the case of (a), they may be further classified according to the kind of surface or print size.

Thus, since the cartridges are each stored into a different classifying portion according to the order information, if the operation is carried out for each of the cartridges stored within this classifying portion, then the identical operation can be continuously carried out and the working efficiency is improved. In addition, since the classifying work is automated, labor required of the operator is eliminated and the erroneous discrimination is also eliminated.

In addition, if the recording portion is provided at the tip end of the photographic film, it is not necessary to withdraw the latent image portion of the photographic film to ease the work for recording and reading the order information.

As seen from above, the apparatus for classifying the photographic film according to the present invention exhibits an excellent effect in that the photographic films can be automatically classified and their erroneous discrimination can be eliminated to improve the working efficiency.

DETAILED DESCRIPTION OF THE PREFERRED EMBODIMENT

Figure 1:
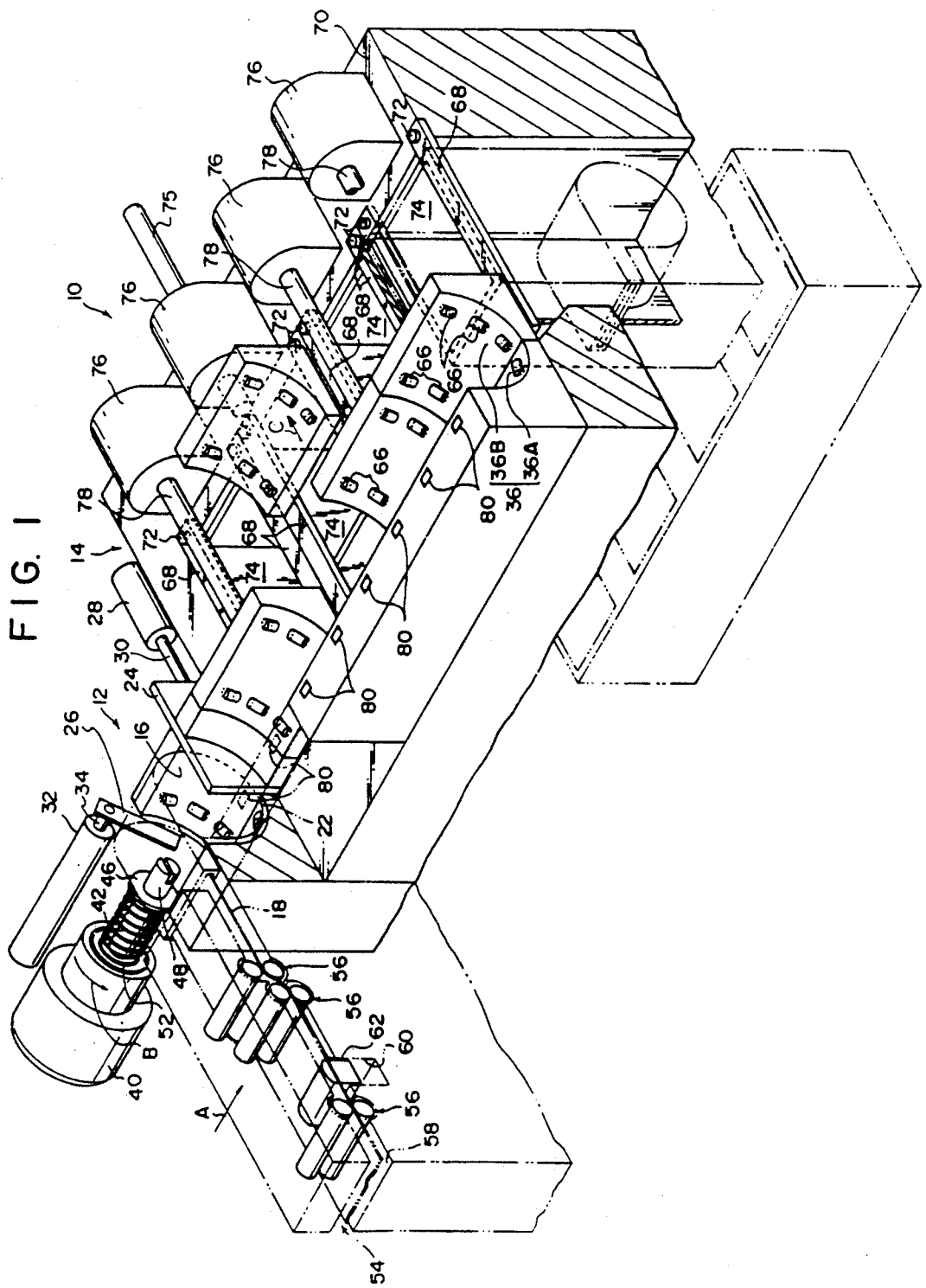
FIG. 1 is a perspective view of an apparatus for classifying negative films according to the present invention.
Figure 2:
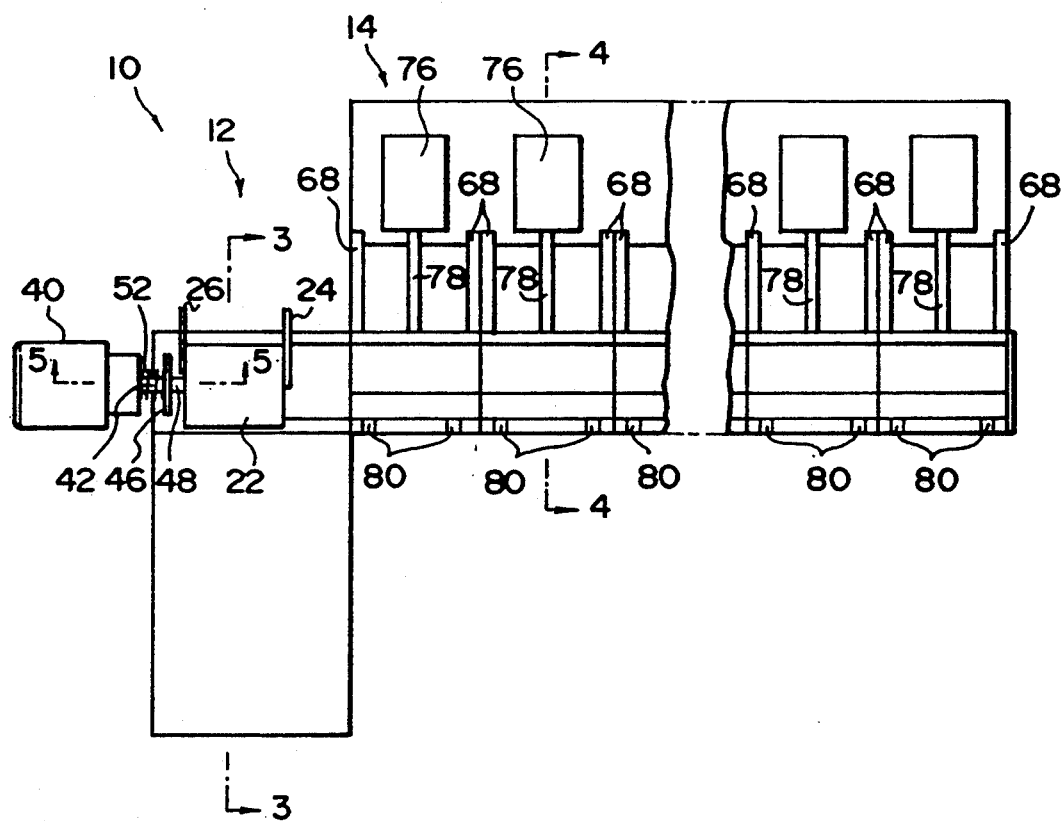
FIG. 2 is a plan view of the apparatus according to the present invention.

In FIGS. 1 and 2, an apparatus 10 for classifying the negative films according to the present invention is illustrated. This apparatus 10 is comprised of an order information reader portion 12 and a negative conveying portion 14 adjacent thereto.

Figure 3:
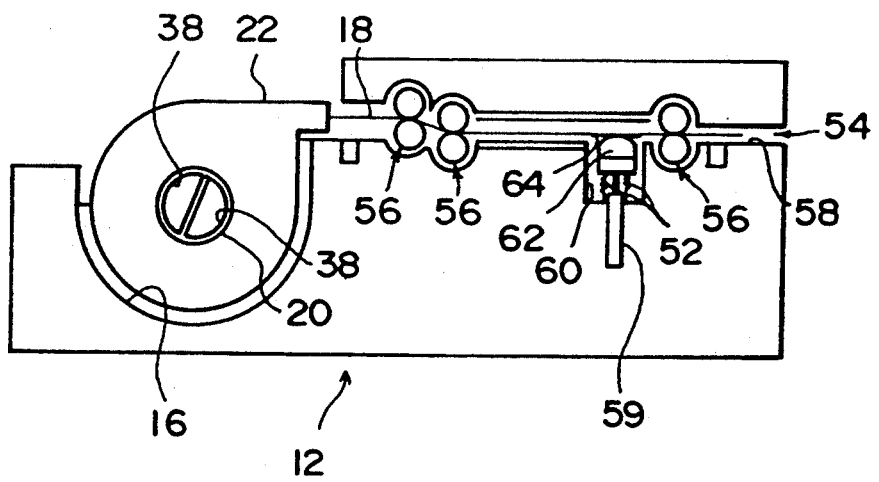
FIG. 3 is a cross-sectional view taken along line 3—3 of FIG. 2.

As shown in FIG. 3, the order information reader portion 12 comprises a rack 16 on which an arcuate cartridge is placed to wind a negative film 18, which has been photographed, about a spool 20 for storage. The cartridge 22 placed on the rack 16 is sandwiched by means of a press plate 24 and an extruding plate 26. This press plate 24 is connected to a shaft 30 of a solenoid 28. When electric current is conducted through the solenoid 28, the shaft 30 is pulled in to release the pressure applied to the cartridge 22. Meanwhile, the extruding plate 26 is connected to the shaft 34 of a cylinder 32. In this case, when the above-described press plate 24 is released from the pressure, the shaft 34 of this cylinder 32 extends and moves in the axial direction to feed out the cartridge 22 into a conveying path 36 of a negative transfer portion 14 which will be later described.

As shown in FIG. 3, one end portion of a spool 20 of the cartridge 22, as viewed in its axial direction, protrudes out of the lateral wall of the cartridge 22. A pair of semicircular groove portions 38 is formed on the tip end surface of this spool 20 and, as shown in FIG. 1, is opposed to a rotating shaft 42 of a driving motor 40. The driving motor 40 is connected to a control unit 44 (see FIG. 6) so that it can be rotated in the clockwise and counterclockwise directions in accordance with a signal therefrom.

Figure 5:
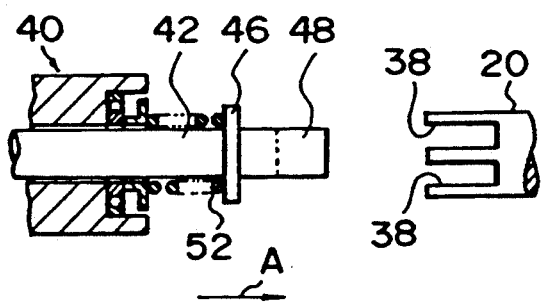
FIG. 5 is a cross-sectional view taken along line 5—5 of FIG. 2.

As shown in FIG. 5, at the tip end of the rotating shaft 42, a disc-shaped jaw portion 46 (see FIG. 1) is formed, and a pair of nails or prongs 48 is protrudingly formed therefrom. At the rotating shaft 42, a compression coil spring 52 is mounted between the driving motor 40 and the jaw portion to urge the rotating shaft 42 and the nails 48 in the extending direction (in the direction of arrow A of FIG. 5). Therefore, when the cartridge 22 is placed onto the rack 16, the nails 48 will abut against one end portion of the spool 20, as viewed in the axial direction, by the a force urged by the compression coil spring 52. Here, when the driving motor 40 is rotated in the clockwise direction (the direction of arrow B as viewed in FIG. 1), the nails 48 come into the groove portions 38, and the nails 48 and the spool 20 come in engagement so that the rotating force of the driving force 40 is transmitted to the spool 20.

As shown in FIG. 3, when the spool 20 is rotated, the negative film 18, which had been wound about the spool 20, is pulled out. A guideway 54 is formed in the direction in which this negative film is withdrawn. At the guideway 5, three pairs of rollers 56 are disposed and the withdrawn negative films 218 are each sandwiched by these pairs of rollers 56 to be conveyed along the guideway 54.

A rectangular groove 60 is formed on a lower base 58 which constitutes part of the guideway 54, and a read head 62 is accommodated therein. The read head 62 is supported by the compression coil spring 52 (see FIG. 3), and when a solenoid 59 disposed downwardly of the read head 6 is electrically conducted, the read head 62 will be disposed on a corresponding moving locus of the negative film 18 by a predetermined urging force. As a result, the lower surface of the negative film 18 will be moved keeping in contact with this read head 62.

A magnetic material is applied to the lower surface of the negative film 18 adjacent to its tip end portion so as to provide a magnetic recording layer 64. On this magnetic recording layer 64, order information is recorded by means of an order input unit (not shown). That is, the operator inputs the order information such as, for example, the distinction of the developing alone or simultaneous print, size, kind or surface or the like, which is described on the DP bag by the order input unit, looking at it when the negative film 18 is conveyed.

The read head 62 is connected to the control unit 44 and the read information is supplied to the control unit 44.

When the shaft 34 of the cylinder 32 extends out and the press plate 24 of the cartridge is pulled in via the shaft 30, the cartridge 22 placed on the rack 16 extends and is fed into the conveying path 36 of the negative conveying portion 14 pressed against the extruding plate 26. Incidentally, a plurality of idle rollers 66 protrudes onto the surface of the guideway 36, and the cartridge 22 is supported with a small frictional force by these idle rollers 66.

Figure 4:
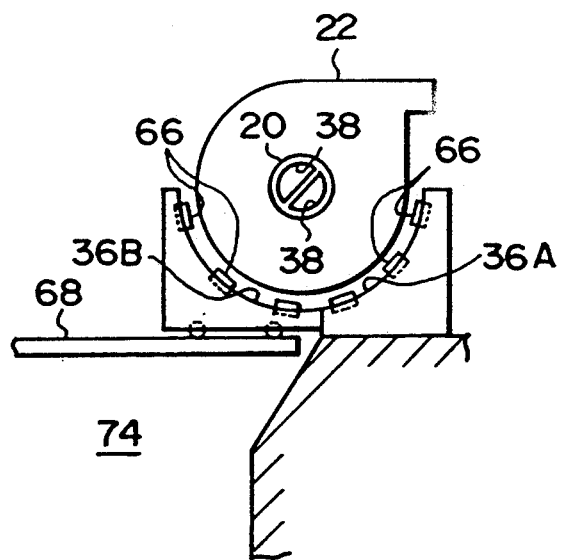
FIG. 4 is a cross-sectional view taken along line 4—4 of FIG. 2.

As shown in FIG. 4, the conveying path 36A is comprised of a continuous fixed conveying path of ¼ arc (in this embodiment, integral) and a movable conveying path 36B of ¼ arc divided into a plural number. With this fixed conveying path 36A and the movable conveying path 36B abutting, an arcuate conveying path 36 is formed so as to store about a half of the circumferential surface of the cartridge 22. The movable conveying path 36B is supported by a pair of rails 68 respectively. The movable conveying path 36B is movable along these rails 68. The rail 68 extends at a right angle to the conveying path 36 so that its tip end portion, as viewed in the extending direction, is fixed to a base 70 by means of a screw 72.

A cartridge storing portion 74 divided for each of the movable conveying path 36B is formed between the base 70 and the fixed conveying path 36A. As a result, when the movable conveying path 36B, on which the cartridge 22 is placed, is moved along the rails 68 in the direction moving away from the fixed conveying path 36A (the direction of arrow C of FIG. 1), a space results between the fixed conveying path 36A and the movable conveying path 36B with the result that the cartridge 22 will slide down into the cartridge storing potion 74.

Connected to the rear surface of the movable conveying path 36B is a shaft 78 of the solenoid 76 and, when the solenoids 76 is electrically conducted or interrupted and the shaft 78 extends out (see portion 75 in FIG. 1) or is withdrawn, the movable conveying path 36B is moved along the rails 68. As seen from above, the conveying path 36 and the cartridge storing path 74 forms a portion for classifying the negative film 18, that is, the cartridge 22.

On the upper surface (horizontal plane) of the fixed conveying path 36A, a pair of infrared ray sensors 80 is mounted corresponding to each movable conveying path 36B. This infrared ray sensor 80 is connected to the control unit 44 to detect whether the cartridge is passing over the conveying path or not. Incidentally, at the control unit 44, both of the infrared ray sensors 80 detect the presence of the cartridge 22 to recognize the position of the cartridge 22.

Figure 6:
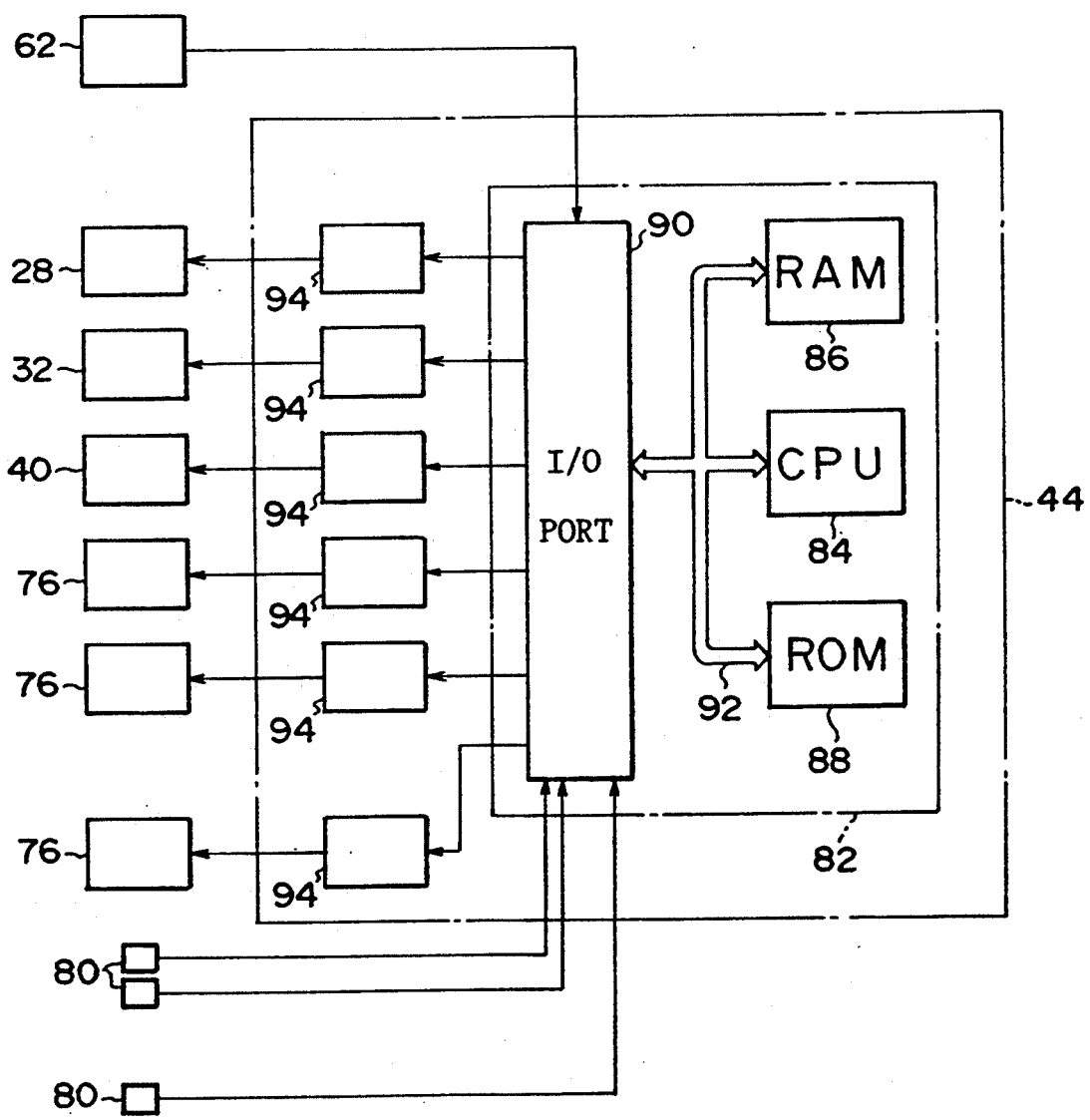
FIG. 6 is a control block diagram.

As shown in FIG. 6, the control unit 44 includes a microcomputer 82. The microcomputer 82 is comprises of a CPU 84, RAM 86, ROM 88, input/output port 90, and buses 92 such as data buses or control buses for connecting these.

Connected to the I/O port 90 are a solenoid 28 (for driving the press plate 24). cylinder 32 (for driving the extruding plate 26), driving motor 40 (for rotating the spool 20) and a solenoid 76 (for driving the movable conveying path 36B) via the driver 94. In addition, connected to this I/O port 90 are a read head 62 (for reading the order information) and an infrared ray sensor 80 (for detecting the cartridge 22).

Within RAM 86, selection data on the cartridge storing portion 74 based on the order information is previously stored to select a predetermined cartridge storing portion 74 from a plurality of cartridge storing portions 74 in accordance with the order information read by the read head 62.

Figure 7:
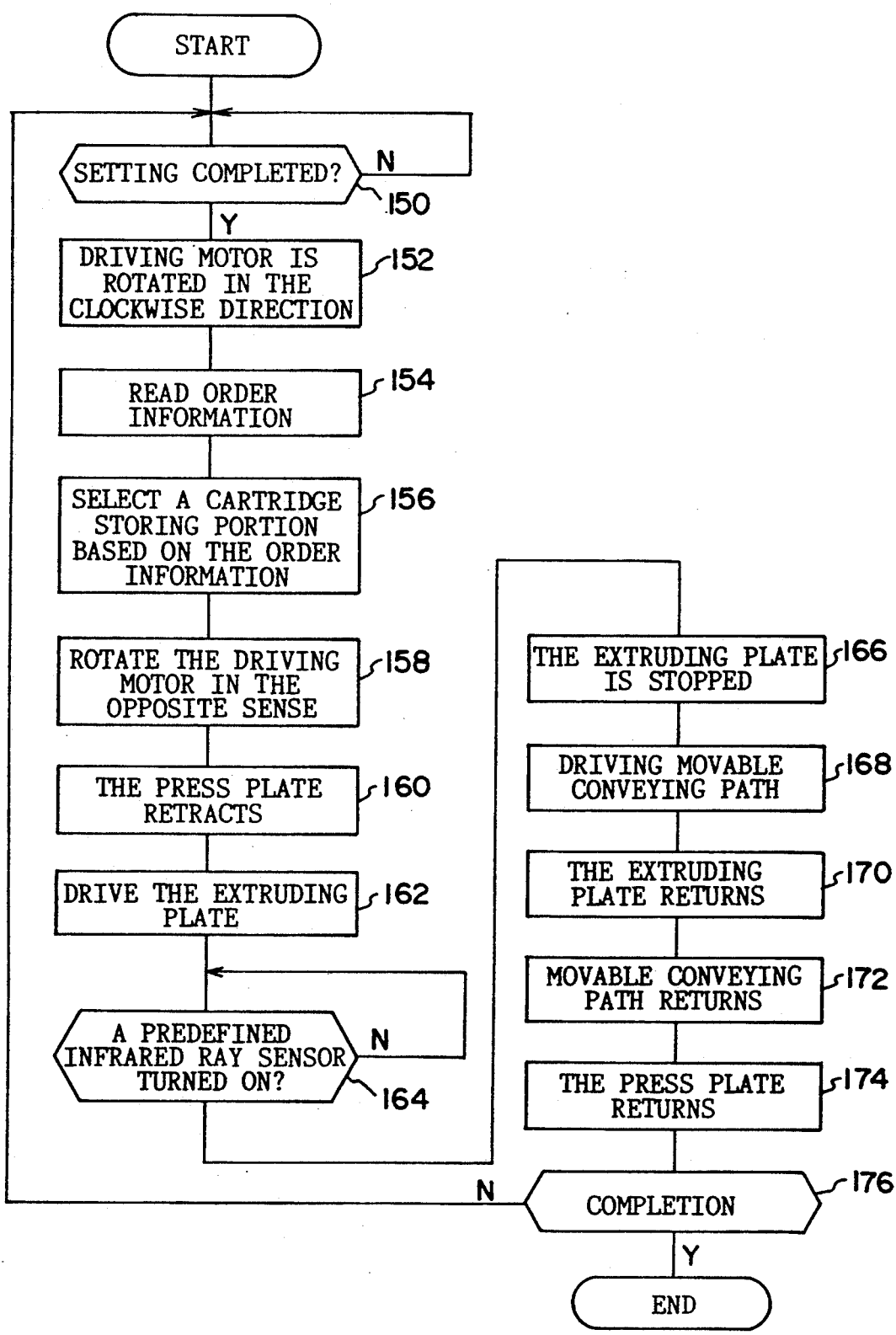
FIG. 7 is a control flowchart.

The operation of the present invention is hereinafter described with reference to a flowchart of FIG. 7.

First, in step 150, the cartridge 22 is placed onto the rack 16 for placing the cartridge and it is determined whether a start button or the like is operated or not. Incidentally, the sensor may be provided on the rack 16 to automatically detect the presence or absence of the cartridge for automatic starting.

If, in step 150, the answer is yes, then the procedure is shifted to step 152 to rotate the driving motor 40 in the clockwise direction. As a result, the nails 48 and the spool 22 come in engagement, so that the negative film 18 wound about the spool 22 is fed out to the guideway 54. The negative film, which has been fed out to the guideway 54, is pinched by the three pairs of rollers to be conveyed keeping in contact with the read head 62. In step 154, during this contact and movement, the order information recorded on the magnetic recording layer 64 at the tip end portion of the negative film 18 is read. Subsequently, in step 156, based on the read information, one of the plurality of cartridge storing portions 74 is selected to shift to step 158. In step 158, the driving motor 40 is oppositely rotated and the fed-out negative film 18 is wound again about the spool 20. When this winding is completed, the procedure is shifted to step 160 to drive the solenoid 28 to retract the press plate 24 and, in step 162, the cylinder 32 is driven to convey the cartridge 22 to the conveying path 36 of the negative conveying portion by the extruding plate 26. During this conveyance, when, in step 164, the presence or absence of the cartridge 22 is detected by the predetermined infrared ray sensor 80, then the procedure is shifted to step 166 to stop the driving of the extruding plate 26. Since, at this stop position, the cartridge 22 is detected by the pair of infrared ray sensors 80, it is placed onto a single movable conveying path 36B.

In step 168, the solenoid 76 is driven and the movable conveying path 36B is moved along the rail 68 to be separated off the fixed conveying path 36A. As a result, a space is created between the fixed conveying path 36A and the movable conveying path 36B, and the cartridge slides down into the selected cartridge storing portion 74.

In steps 170, 172 and 174, the extruding plate 26, movable conveying path 36B and the press plate 24 are returned to their original position to shift to step 176, where it is determined whether all the cartridges 22 have been classified or not. If no, then the procedure is shifted to step 150 and the above-described steps are repeated. If, in step 176, the answer is yes, the operation is completed.

As seen from above, in this embodiment, the order information recorded on the magnetic recording layer 64 of the negative film 18 may be read to automatically classify for each negative film to be treated, the negative film having the same content can be continuously treated to improve the working efficiency. In addition, since the classification is automatically carried out, no erroneous judgment occurs with the result that the useless work such as the rehandling can be reduced.

Incidentally, although, in this embodiment, the magnetic recording layer is provided on the negative film 18, a magnetic tape may be adhered thereto.

What is claimed is:

1. Apparatus for classifying photographic films in which cartridges are classified according to a customer's order information, each cartridge storing a photographic film provided with a recording portion on which the customer's order information is magnetically recorded, said apparatus comprising:
   a plurality of classifying portions;
   a driving means, for driving said photographic film, which delivers said photographic film out of a corresponding said cartridge;
   a read means for reading said order information from said recording portion of the delivered photographic film, said driving means being operative for winding and storing said delivered photographic film into said cartridge after said order information is read by said read means;
   a selector means for selecting one of said plurality of classifying portions based on said order information read by said read means; and
   a transfer means for transferring said cartridge in a predetermined direction into the selected classifying portion.

2. The apparatus for classifying photographic films as set forth in claim 1, wherein said plurality of classifying portions is continuously disposed in the predetermined direction in which said cartridge is transferred by said transfer means.

3. The apparatus for classifying photographic films as set forth in claim 2, wherein said classifying portions are each provided with a storing portion for storing said cartridge.

4. The apparatus for classifying photographic films as set forth in claim 3, wherein said classifying portions each comprises a fixed retainer portion and a retainer member movable between a first position, where said cartridge is supported with said retainer portion, and a second position, where said cartridge is stored into said storing portion.

5. The apparatus for classifying photographic films as set forth in claim 4, wherein said fixed retainer portions are integrally fixed together over an entire length of said plurality of classifying portions.

6. The apparatus for classifying photographic films as set forth in claim 5, wherein each said retainer member is moved at a substantially right angle to the predetermined direction in which said cartridge is transferred by said transfer means.

7. The apparatus for classifying photographic films as set forth in claim 6, wherein the predetermined direction of transfer of said cartridge by said transfer means is in an axial direction of said cartridge.

8. The apparatus for classifying photographic films as set forth in claim 7, wherein each of said plurality of classifying portions includes a detection means for detecting that said cartridge has moved past said classifying portion.

9. The apparatus for classifying photographic films as set forth in claim 8, wherein each of said plurality of classifying portions includes a slide means for permitting said transfer means to transfer smoothly said cartridge.

10. The apparatus for classifying photographic films as set forth in claim 9 wherein said slide means comprises a roller means.

11. Apparatus for classifying photographic films in which substantially cylindrical cartridges are classified according to a customer's order information, each cartridge storing a rolled photographic film having a recording portion on which the customer's order information is magnetically recorded, said apparatus comprising:

a plurality of classifying portions;

a film driving means, for driving said photographic film, which delivers said photographic film out of a corresponding said cartridge and winds the delivered photographic film into said cartridge;

a read means for reading said order information from said recording portion of said delivered photographic film;

a selector means for selecting one of said plurality of classifying portions based on said order information read by said read means;

a transfer means for transferring said cartridge in a predetermined direction into the selected one of said plurality of classifying portions; and a control means for controlling driving of said film driving means so as to deliver said photographic film out of said cartridge and for controlling driving of said film driving means after said order information is read by said read means so that said photographic film is wound into said cartridge, and further for controlling said transfer means so that said cartridge is moved into said selected classifying portion based on the selection made by said selector means.

12. The apparatus for classifying photographic films as set forth in claim 11, wherein said classifying portions are continuously disposed in the predetermined direction in which said cartridge is transferred by said transfer means.

13. The apparatus for classifying photographic films as set forth in claim 12, wherein said cartridge includes a body portion, which is elongated in an axial direction, and opposite end portions, and wherein said transfer means comprises a pressure member for pressing one of the end portions of said cartridge to move said cartridge.

14. The apparatus for classifying photographic films as set forth in claim 13, wherein said classifying portions are each provided with a storing portion for storing said cartridge.

15. The apparatus for classifying photographic films as set forth in claim 14, wherein the predetermined direction in which said cartridge is transferred by said transfer means is in the axial direction of said cartridge.

16. The apparatus for classifying photographic films as set forth in claim 15, wherein said plurality of classifying portions each comprises a fixed retainer portion having a cross section of substantially ¼ arc corresponding to the substantially cylindrical form of said cartridge, and a retainer member disposed corresponding to said retainer portion while having a cross section of substantially ¼ arc corresponding to the substantially cylindrical form of said cartridge to form a cross section of a substantially semicircular arc corresponding to the substantially cylindrical form of said cartridge with said retainer portion so as to move between the position for retaining said cartridge and a position spaced apart from said retainer portion where said cartridge is dropped into said storing portion.

17. The apparatus for classifying photographic films as set forth in claim 16, wherein said fixed retainer portions are integrally fixed together for an entire length of said plurality of classifying portions.

18. The apparatus for classifying photographic films as set forth in claim 17, wherein each of said plurality of classifying portions includes a detection means for detecting that said cartridge has moved past said classifying portion.

19. The apparatus for classifying photographic films as set forth in claim 18, wherein said control means controls said transfer means so that transfer of said cartridge by said transfer means is stopped when said cartridge is detected by said detection means.

20. The apparatus for classifying photographic films as set forth in claim 18, wherein each said fixed retainer portion and each said retainer member includes rollers to permit transfer of said cartridge smoothly by said transfer means.

* * * * *